United States Patent [19]
Del Buono

[11] Patent Number: 6,118,582
[45] Date of Patent: Sep. 12, 2000

[54] SLIDE HOLDER

[75] Inventor: Steven Carlos Del Buono, Fair Oaks, Calif.

[73] Assignee: Immuno Concepts, Inc., Sacramento, Calif.

[21] Appl. No.: 09/352,013

[22] Filed: Jul. 12, 1999

[51] Int. Cl.[7] .............................................. G02B 21/26
[52] U.S. Cl. ........................ 359/398; 359/391; 359/396
[58] Field of Search ........................... 359/391, 396–398; 356/244

[56] References Cited

U.S. PATENT DOCUMENTS

| | | | |
|---|---|---|---|
| Re. 34,841 | 1/1995 | Suovaniemi et al. | 356/249 |
| D. 239,548 | 4/1976 | Schiff et al. | D16/50 |
| D. 256,470 | 8/1980 | Gordon | D16/50 |
| D. 269,702 | 7/1983 | Suovaniemi et al. | D24/8 |
| 2,302,830 | 11/1942 | Axelrad | 359/396 |
| 2,561,339 | 7/1951 | Chediak | 359/398 |
| 2,761,558 | 9/1956 | McLean, Jr. | 359/391 |
| 3,649,464 | 3/1972 | Freeman | 356/244 |
| 3,736,042 | 5/1973 | Markovits et al. | 359/398 |
| 3,992,265 | 11/1976 | Hansen | 356/244 |
| 4,039,247 | 8/1977 | Lawman et al. | 356/244 |
| 4,159,875 | 7/1979 | Hauser | 356/244 |
| 4,319,841 | 3/1982 | Suovaniemi et al. | 356/244 |
| 4,349,275 | 9/1982 | Ayotte et al. | 356/244 |
| 4,387,972 | 6/1983 | Valencia | 356/244 |
| 4,411,518 | 10/1983 | Meserol et al. | 356/244 |
| 4,431,924 | 2/1984 | Suovaniemi et al. | 250/566 |
| 4,501,495 | 2/1985 | Faulkner et al. | 356/244 |
| 4,659,222 | 4/1987 | Ekholm | 356/244 |
| 4,682,890 | 7/1987 | de Macario et al. | 356/244 |
| 4,682,891 | 7/1987 | de Macario et al. | 356/244 |
| 4,722,598 | 2/1988 | Ford | 359/398 |
| 4,819,804 | 4/1989 | Levy | 206/456 |
| 4,836,667 | 6/1989 | Ozeki | 359/398 |
| 4,919,894 | 4/1990 | Daniel | 422/104 |
| 5,084,246 | 1/1992 | Lyman et al. | 422/101 |
| 5,110,556 | 5/1992 | Lyman et al. | 422/101 |
| 5,308,584 | 5/1994 | Vauramo | 422/104 |
| 5,470,536 | 11/1995 | Jarvimaki | 422/102 |
| 5,592,289 | 1/1997 | Norris | 356/244 |
| 5,595,710 | 1/1997 | Van Dusen et al. | 422/104 |
| 5,641,683 | 6/1997 | Van Dusen et al. | 436/46 |
| 5,772,967 | 6/1998 | Wannlund et al. | 356/244 |

*Primary Examiner*—Thong Nguyen
*Attorney, Agent, or Firm*—Fulwider Patton Lee & Utecht, LLP

[57] ABSTRACT

The invention is directed to a slide holder for receiving one or more microscope slides. The slide holder includes a generally rectangular frame and at least one slot, each of the slots for receiving one slide. Flexible retaining latches and retaining grooves are provided at each of the slots for facilitating the securing of the slides.

15 Claims, 3 Drawing Sheets

SLIDE HOLDER

BACKGROUND OF THE INVENTION

The invention relates to a slide holder for holding slides and, more particularly, it concerns a slide holder of unitary construction for receiving and securing one or more microscope slides.

In serologic and other diagnostic procedures requiring the microscopic examination of solid or liquid samples or specimens such as tissue, blood, urine, spinal fluid, sputum, or cell cultures, the customary practice has been to place a small drop of the specimen to be analyzed in or on a well, or retaining area, on a slide. Placing the specimen on the slide forms a thin film on the slide. The slide is often made of glass and consequently, the slide may be fragile and susceptible to being scratched or otherwise damaged. Manipulation may cause damage to the specimen as well. Accordingly, careful handling of specimen slides is a concern.

Moreover, the automated chemical and biological analysis of solid or liquid specimens is a common practice in numerous technological fields. These specimens are frequently placed on a slide, such as a microscope slide (also termed microslide), and form a film thereon. Examples of such fields include, but are not limited to, the field of medicine or health care and the field of pollution analysis and control. For example, instruments for automated blood cell analysis are known in the art.

Equipment used to facilitate the automated analysis of specimens often require that the specimens be stacked, transported, and properly oriented within an automated analytical instrument. It is therefore desirable to employ a device for storing and holding individual or multiple slides in a manner such that specimens retained thereon are protected during handling and the assay process. Further, it is desirable to employ a device that otherwise protects slides when using automated machinery, thus speeding up the assay. Preferably, the slides should be able to be quickly inserted into and removed from such a device with a minimum amount of effort. It is desirable that the slides be secured to the device and properly oriented. Even without the use of automated equipment, it is desirable to conveniently handle, store, and protect individual or multiple slides.

Thus, there exists a need for an improved slide holder that can be used to secure, transport, and protect one or more slides and the specimens thereon. It is also desirable that such a slide holder be easy to use, inexpensive to manufacture, and constructed from materials that are common in the industry today. The present invention addresses these needs.

SUMMARY OF THE INVENTION

Briefly, and in general terms, the present invention is directed to an improved slide holder design for holding and protecting slides.

A slide holder of unitary construction is disclosed that secures and protects a plurality of specimen slides and the specimens thereon. The slide holder may be used with automated machinery. The slides are held in place by the engagement of a retaining latch that overlays a portion of the slide. The retaining latch allows for the easy insertion and removal of slides.

In one aspect of the invention, there is provided a slide holder for securing one or more substantially planar slides. The slide holder includes a generally rectangular frame having four edges and including at least one slot, each of the slots for receiving one slide. The four edges of the frame are defined by a first member, a second member, a third member, and a fourth member. The first member is generally parallel to the second member, and the third member is generally parallel to the fourth member. The first member includes a first support ledge traversing at least one slot and the second member includes a second support ledge traversing at least one slot. The support ledges facilitate the securing of one or more slides to the frame. Dividers and protruding members assist in securing slides to the slide holder in a desired orientation with proper spacing therebetween. A flexible retaining latch is provided for engagement of a slide. The retaining latch is attached to the first support ledge at a slot and has a first position and a second position. When the retaining latch is in the first position, the retaining latch overlays a portion of the slide and facilitates the securing of the slide adjacent the first support ledge. A retaining groove is cut into the second member at each of the slots for facilitating the securing of the slide adjacent the second support ledge.

Other features and advantages of the present invention will become more apparent from the following detailed description, taken in conjunction with the accompanying drawings, which illustrate, by way of example, the principles of the invention.

DETAILED DESCRIPTION OF THE PREFERRED EMBODIMENTS

Figure 1:
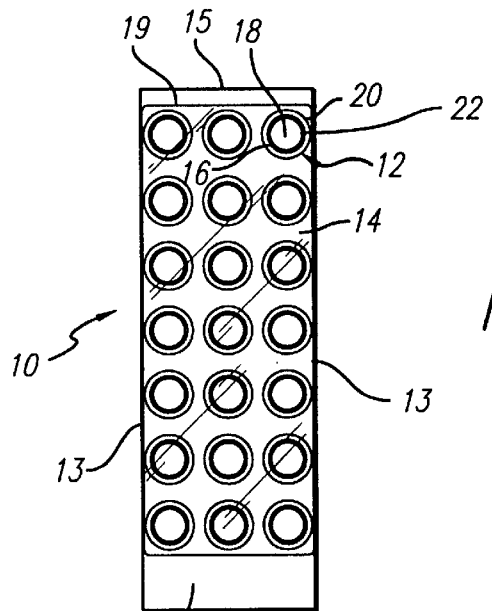
FIG. 1 is a top plan view of one preferred embodiment of a slide for use with a slide holder of the present invention.

Referring now to the drawings wherein like reference numerals indicate like or corresponding elements among the figures, the present invention includes a slide holder for holding specimen slides. It is contemplated that the slide holder may be used with conventional automated machinery.

Referring to FIG. 1, slide 10 is one example of a slide that may be used in conjunction with the present invention. Embodiments of the slide are described in detail in U.S. Pat. No. 4,387,972 entitled "MICROSCOPE SLIDE WITH CONFIRMING WELLS" and assigned to Immuno Concepts, Incorporated, of Sacramento, Calif., which is incorporated herein in its entirety by reference. Other specimen holders or slides could be used in conjunction with the present invention and are known in the art.

The slide 10 is relatively thin in profile and may be made of glass for ease of manufacturing. The slide 10 is formed as an elongated rectangular plate. having a plurality of structurally defined retaining areas 12 spaced apart longitudinally in a plurality of rows on a top surface 14 of the plate. In one preferred embodiment, the slide 10 may not have any retaining areas 12. The rectangular slide 10 is defined by a pair of substantially parallel long sides 13 each of which are generally orthogonal to a pair of short sides 15. In one preferred embodiment, slide 10 further includes a first end portion 17 opposing a second end portion 19. Each of the first and second end portions 17, 19 being bounded in part by a short side 15.

In typical use, a specimen is placed in each of the defined retaining areas 12. Then, if necessary, substrates are added, and the specimen-substrate mixture is allowed to incubate for the required time period, which will vary according to the specific diagnostic procedures employed. A thin transparent coverslip (not shown) may be pressed gently over the slide, and the entire cover-slip slide combination placed under a microscope for visual examination. Each retaining area 12 is defined by an opaque first boundary 16 forming a test well 18, and a second boundary 20 forming a channel 22. Acting as a moat, the channel 22 will confine liquid spilling from the test well within the retaining area.

Figure 2:
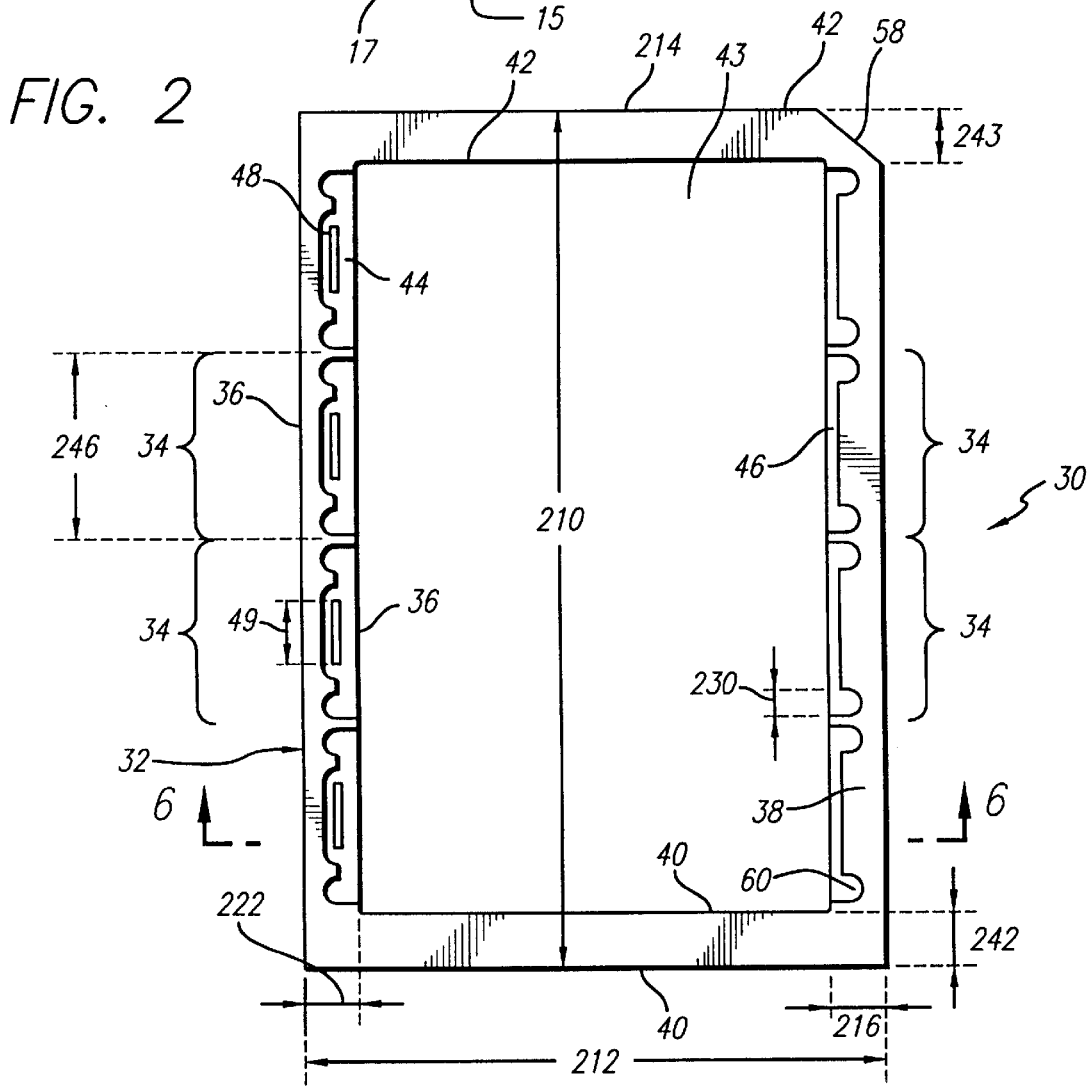
FIG. 2 is a top plan view of the slide holder with no slides in place.

Referring to FIG. 2, in one presently preferred embodiment, the slide holder 30 is designed to hold up to four slides 10. The slide holder has a generally rectangular frame 32. The frame includes one or more (e.g., four) slots 34. Each of the slots is designed to receive one slide. The frame is defined by a first member 36, a second member 38, a third member 40, and a fourth member 42. The first member 36 is generally parallel to the second member 38, and the third member 40 is generally parallel to the fourth member 42. The members 36, 38, 40, 42 together define an opening 43.

The first member 36 includes a first support ledge 44 traversing at least one slot 34. The second member 38 includes second support ledge 46, also traversing at least one slot 34. In a presently preferred embodiment, support ledges 44, 46 traverse each slot 34. The support ledges 44, 46 facilitate the securing of one or more slides 10 to the frame 32. A retaining means for securing a slide, such as flexible retaining latch 48, is provided for engagement of the first end portion 17 (FIG. 1) of a slide. The retaining latch 48 is attached to the first support ledge 44 at a slot. Preferably, there is one retaining latch per slot; however, it is contemplated that a retaining latch could be provided at either or both of the first support ledge 44 and the second support ledge 46 of each slot.

Figure 6:
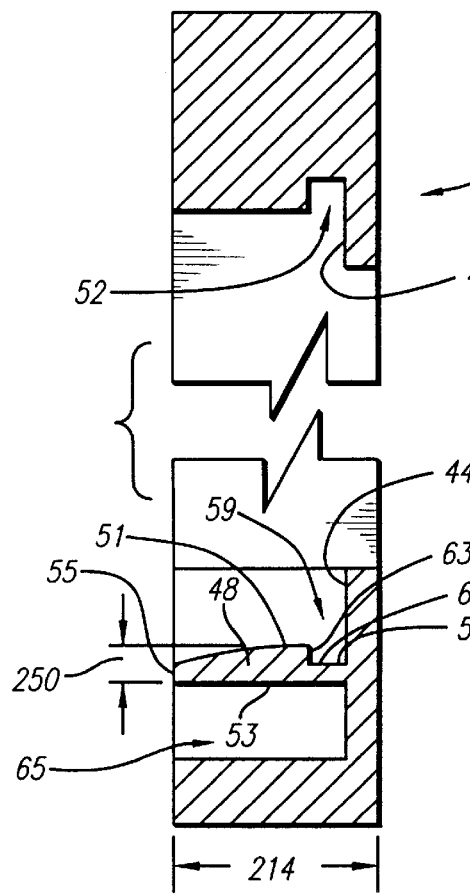
FIG. 6 is an enlarged sectional view of the slide holder of FIG. 2 taken along line 6—6 of FIG. 2.

The retaining latch 48 naturally assumes a first position, as depicted in FIGS. 2 and 6. However, when depressed, the retaining latch assumes a second deflected position (not shown). When the retaining latch 48 is in the first position, the retaining latch operates to overlay a portion of the first end portion 17 of the slide 10 and facilitates the securing of the first end portion 17 of the slide adjacent to the first support ledge 44. The retaining latch 48 could alternatively be positioned on the opposite side of the slide 10 in order to be used to overlay the second end portion 19 of the slide.

As shown in FIGS. 2 and 6, the retaining latch 48 projects in a substantially perpendicular orientation from the ledge 44. The retaining latch 48 has a width 49 extending substantially parallel to the orientation of the first member 36, and that is less than the width 246 of the slot 34. When viewed in cross-section, the retaining latch 48 exhibits a convex front side 51 which faces the opening 43 defined by the frame 32 and a planar rear side 53 facing away from the opening 43. The convex front side 51 inclines from the top 55 of the retaining latch 48 toward the base 57 of the retaining latch 48 where the retaining latch 48 meets the ledge 44.

The retaining latch 48 further includes a slot 59 configured in the front side 51 of the retaining latch 48 and which extends the width 49 and is positioned along the base 57 of the retaining latch 48. Generally, the slot 59 is an orthogonal cut-out that defines a back wall 61 and an overlaying portion 63. In one preferred embodiment, the overlaying portion 63 is intended to overlay the first end portion 17 of the slide. A recess 65 is configured at the rear side of the retaining latch 48 for providing a space into which the retaining latch 48 is deflected when force is applied to the front side 51 of the retaining latch.

Figure 3:
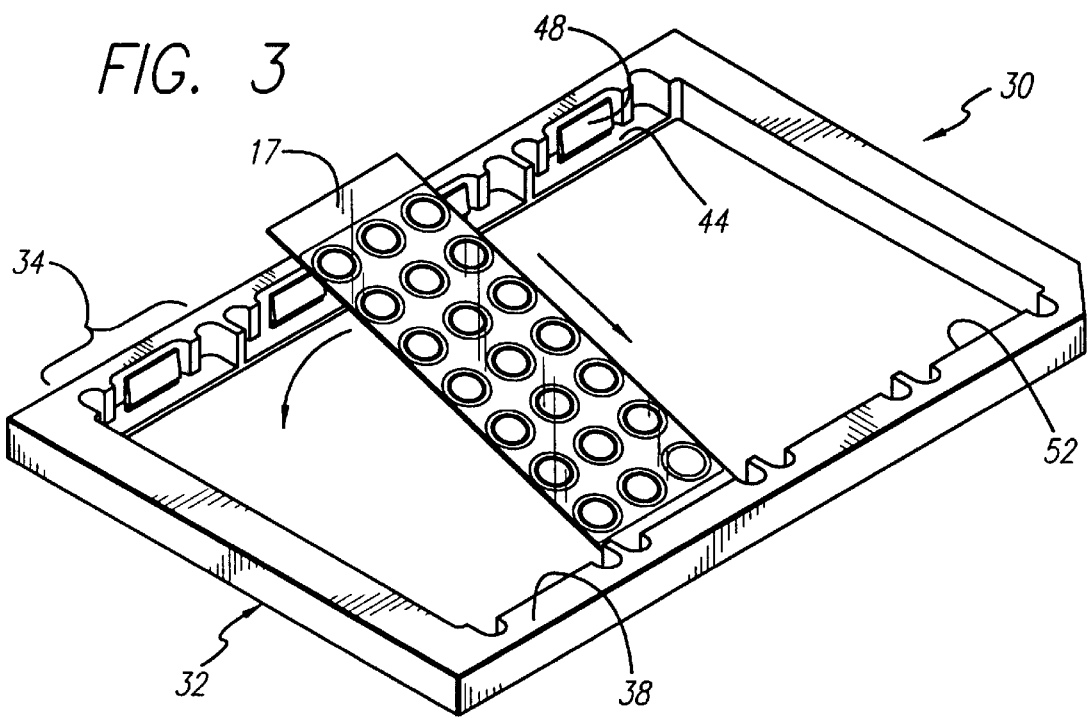
FIG. 3 is a perspective view of the slide holder, depicting a slide in the process of being inserted into the slide holder.
Figure 4:
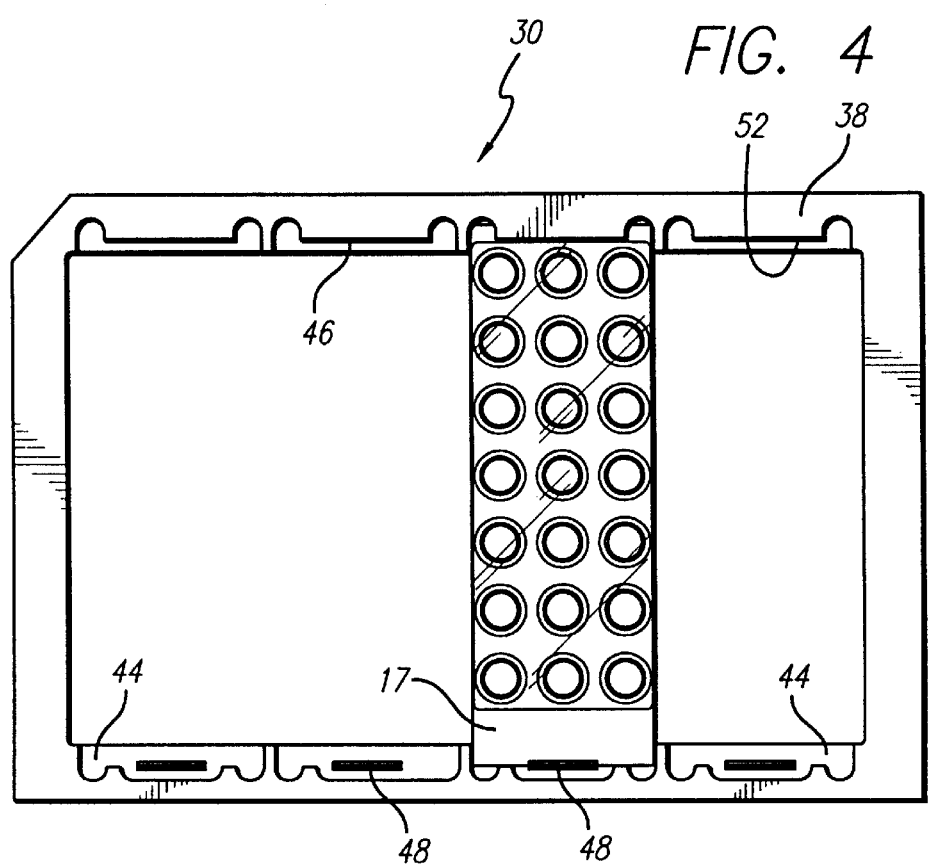
FIG. 4 is a top plan view of the slide holder of FIG. 2, depicting one slide secured in place.

Referring now to FIGS. 3, 4, and 6, a retaining groove 52 defined by substantially orthogonally arranged sidewalls is cut into the second member 38 at each of slots 34. One sidewall of the retaining groove 52 forms part of the second ledge 46, the others providing a space for receiving a slide 10. During insertion of the slide 10 into a slot 34, the second end portion 19 (FIG. 1) of the slide 10 is placed into the appropriate retaining groove 52 by tilting the slide 10 at an angle. The retaining groove 52 facilitates the securing of the second end portion 19 of the slide 10 adjacent to the second support ledge 46, and thus, within the frame 32. The first end portion 17 of the slide 10 is then moved toward the first support ledge 44. The first end portion 17 of the slide 10 makes contact with retaining latch 48 and causes the retaining latch to flex slightly and momentarily assume the second deflected position.

Referring to specifically FIG. 4, the first end portion 17 of the slide 10 is then manually pressed past the convex portion 51 of the retaining latch 48 and toward first support ledge 44. The overlaying portion 63 snaps over the first end portion 17 of the slide 10 and the retaining latch 48 immediately returns to the first position. Alternatively, the retaining latch 48 may be manually deflected. The overlaying portion 63 of the retaining latch 48 thus overlays a portion of the first end portion 17 of the slide 10 and facilitates the securing of the first end portion 17 of the slide 10 adjacent to the first support ledge 44. The retaining latch 48 must always assume the second deflected position in order to insert a slide 10 into the corresponding slot 34 or remove a slide 10 from the corresponding slot. The retaining latch 48 thereby provides for the easy insertion and removal of slides 10. The retaining latch 48 also ensures that the slides 10 are secured in place. While the slide holder 30 may be fully loaded with slides 10 for rapid assay, the retaining latch 48 allows an individual slide to be quickly and easily removed for separate analysis.

Figure 5:
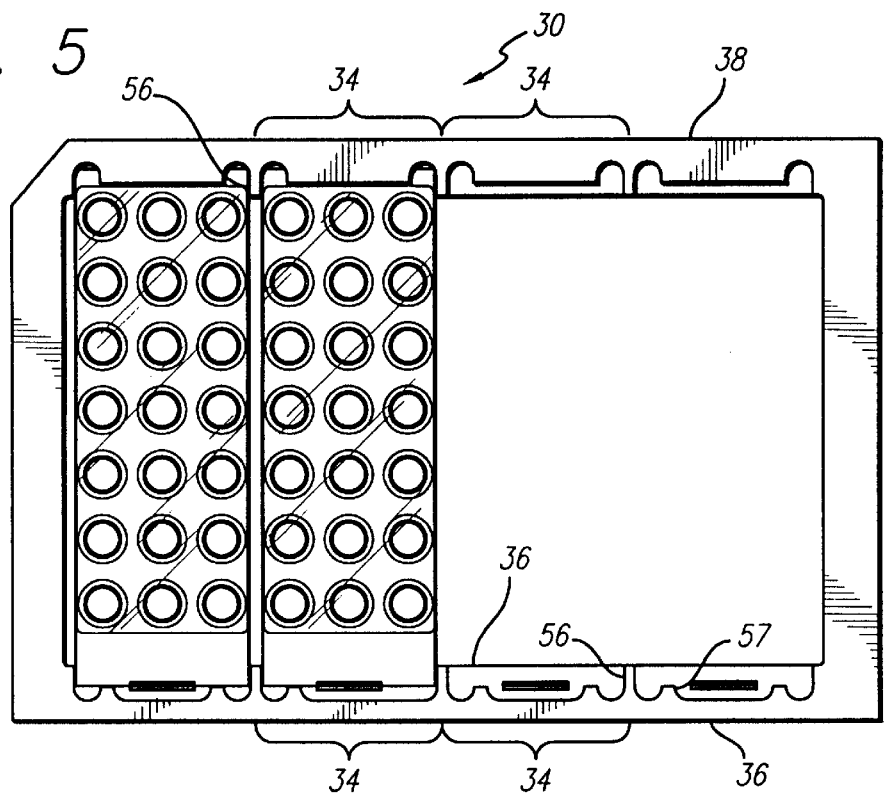
FIG. 5 is a to view of the slide holder of FIG. 2, depicting two slides secured in place.

Referring to FIG. 5, the first member 36 and the second member 38 each have at least one divider 56. Preferably, there is one divider on the first member 36 between each pair of slots 34 and one divider on the second member 38 between each pair of slots 34. The dividers 56 facilitate the securing, separation, and orienting of the slides 10. The slides 10 are further supported by a plurality of protruding members 57 for securing, retaining, and orienting one or more slides. In one preferred embodiment there are two protruding members 57 per slot 34. The slides 10 are thus oriented as desired, and preferably oriented such that the slides assume a well format complementary with automated equipment.

Turning again to FIG. 2, the frame 32 preferably includes a bevel 58 at a corner of the frame. The bevel 58 is useful for properly aligning a plurality of frames during stacking as well as properly configuring the slide holder 30 within conventional automated analytical equipment. The bevel 58 provides one with a rapid indication of the orientation of the slides 10. The first member 36 and second member 38 preferably each include at least one cut-out 60.

In one preferred embodiment, the frame 32 is of unitary construction and is formed of a polymer for ease of fabrication. However, the frame may be formed of other suitable materials and does not necessarily have to be of unitary construction. The frame outer width 210 is approximately 5.025 inches (12.764 centimeters). The frame outer length 212 is approximately 3.366 inches (8.550 cm).

Turning again to FIGS. 2 and 6, the height 214 of at least two of the members 36, 38, 40, 42 is sufficiently greater than that of the slide 10. Consequently, the slide 10 and any specimens thereon are protected from abrasion or other damage during the handling, stacking, or transport of slide holder 30. This is important since slides and the specimens thereon can easily be damaged, especially when automated machinery is utilized. In one preferred embodiment, all of the members 36,38,40,42 preferably have the same height 214, which is approximately 0.250 inches (0.635 centimeters).

Turning again to FIG. 2, in one preferred embodiment the width 222 of first member 36 is approximately 0.315 inches (0.800 cm). Likewise, the width 216 of second member 38 is approximately 0.315 inches (0.800 cm). The width 242 of third member 40 is approximately 0.318 inches (0.808 cm). Likewise, the width 243 of fourth member 42 is approximately 0.318 inches (0.808 cm). The width 49 of each retaining latch 48 is approximately 0.375 inches (0.953 cm).

Turning again to FIGS. 2 and 6, in one preferred embodiment the height of retaining latch 48 is approximately the same as height 214, the height of frame 32. The thickness 250 of retaining latch 48 is approximately 0.045 inches (0.114 cm). Referring again to FIG. 2, each of cut-outs 60 have a cut-out width 230 of 0.156 inches (0.396 cm). The radius of curvature of cut-out 60 is approximately 0.078 inches (0.198 cm). The width 246 of each slot 34 is approximately 1.082 inches (2.748 cm). It is contemplated that the aforementioned dimensions may be varied from those described.

While several particular forms of the invention have been illustrated and described, it will be apparent that various modifications can be made without departing from the spirit and scope of the invention. Accordingly, it is not intended that the invention be limited, except as by the appended claims.

What is claimed is:

1. A slide holder for receiving at least one slide, comprising:

a frame including at least one slot for receiving the slide;

a first support ledge; and a retaining latch projecting from the first support ledge, the retaining latch having a first position and a second position, and being configured to overlay a portion of the slide received in the slot and retain that portion of the slide against the first support ledge.

2. The slide holder of claim 1, wherein the frame is defined by a first member, a second member, a third member, and a fourth member, wherein the first member is generally parallel to the second member, and the third member is generally parallel to the fourth member; and wherein the first member includes the first support ledge traversing at least one slot and the second member includes a second support ledge traversing at least one slot.

3. The slide holder of claim 2, wherein the retaining latch is attached to the first support ledge.

4. The slide holder of claim 2, wherein when the retaining latch is in the first position the retaining latch facilitates the securing of the slide to the first support edge.

5. The slide holder of claim 1, wherein a retaining groove is cut into the second member at each of the slots.

6. The slide holder of claim 1, wherein the retaining latch is flexible.

7. The slide holder of claim 1, wherein the retaining latch must be in the second position in order to insert a slide into the slot or remove a slide from the slot.

8. The slide holder of claim 1, wherein the slide holder includes a plurality of slots and first member and the second member each have at least one divider between each slot.

9. The slide holder of claim 1, wherein the frame is of unitary construction.

10. The slide holder of claim 1, wherein the frame is formed of a polymer.

11. The slide holder of claim 1, wherein the width of at least two of the first, second, third and fourth members are sufficiently greater than that of the slide.

12. The slide holder of claim 1, the retaining latch further including a convex front side and a rear side.

13. The slide holder of claim 12, wherein the rear side is planar.

14. The slide holder of claim 1, the retaining latch further includes a top, a base and an overlaying portion, the overlaying portion being configured proximate the base of the retaining latch.

15. The slide holder of claim 1, the retaining latch further including a front side, a rear side and a slide receiving recess.

* * * * *